Figure 3:
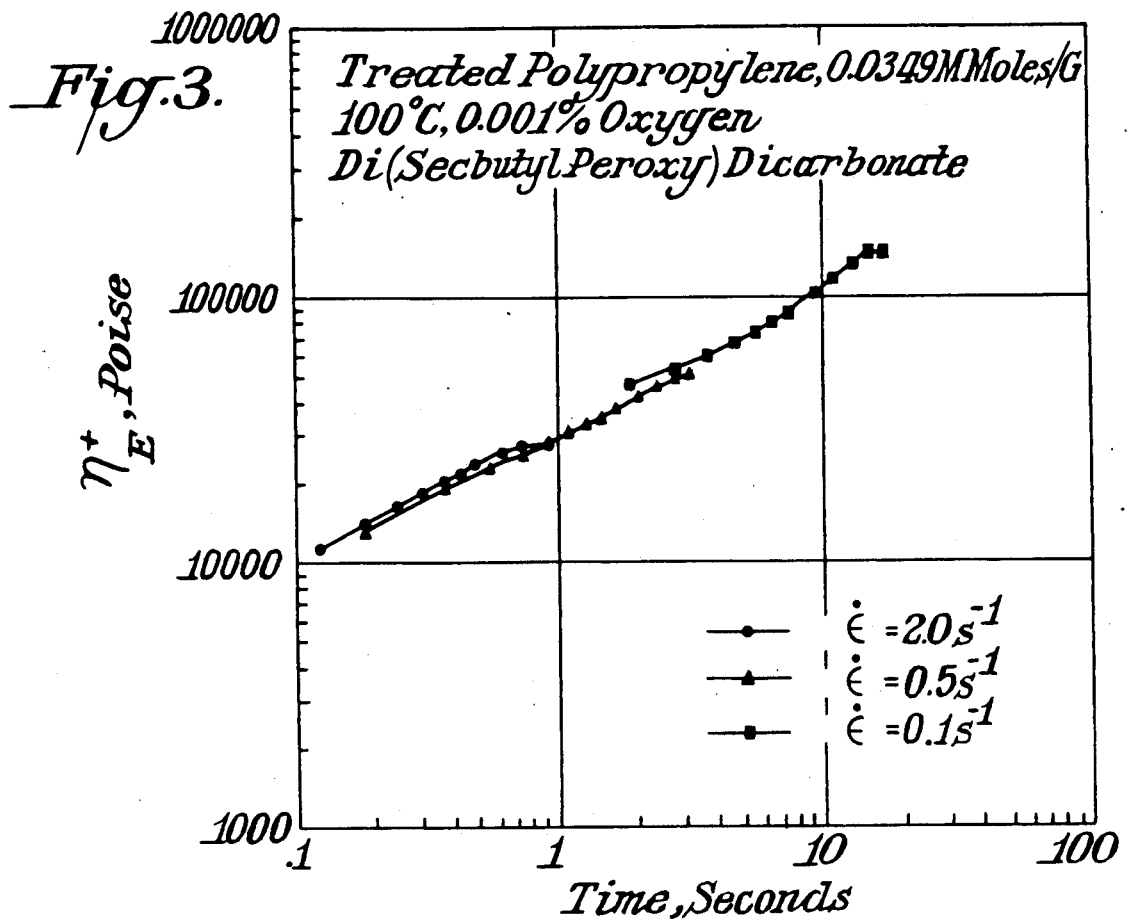

United States Patent [19]

DeNicola, Jr.

[11] Patent Number: 5,047,485
[45] Date of Patent: Sep. 10, 1991

[54] PROCESS FOR MAKING A PROPYLENE POLYMER WITH FREE-END LONG CHAIN BRANCHING AND USE THEREOF

[75] Inventor: Anthony J. DeNicola, Jr., New Castle County, Del.

[73] Assignee: HIMONT Incorporated, Wilmington, Del.

[21] Appl. No.: 313,274

[22] Filed: Feb. 21, 1989

[51] Int. Cl.$^5$ .............................................. C08F 8/50
[52] U.S. Cl. .............................. 525/387; 525/333.8; 525/383; 525/386
[58] Field of Search ............................ 525/387, 386

[56] References Cited

U.S. PATENT DOCUMENTS

| | | | |
|---|---|---|---|
| 3,144,436 | 8/1964 | Greene et al. | 525/387 |
| 3,887,534 | 6/1975 | Baba et al. | 525/387 |
| 4,378,451 | 3/1983 | Edwards | 525/240 |
| 4,451,589 | 5/1984 | Morman et al. | 525/387 |
| 4,578,430 | 3/1986 | Davison | 525/387 |
| 4,707,524 | 11/1987 | Ehrig et al. | 525/333.8 |

*Primary Examiner*—Bernard Lipman

[57] ABSTRACT

Disclosed is a process for making a normally solid, gel-free, amorphous to predominantly crystalline, propylene polymer material having free-end branches of propylene units and strain hardening elongational viscosity by peroxide decomposition of the propylene polymer material in the substantial absence of oxygen at certain temperatures for certain periods of time, and then deactivating the free radicals in the material.

22 Claims, 3 Drawing Sheets

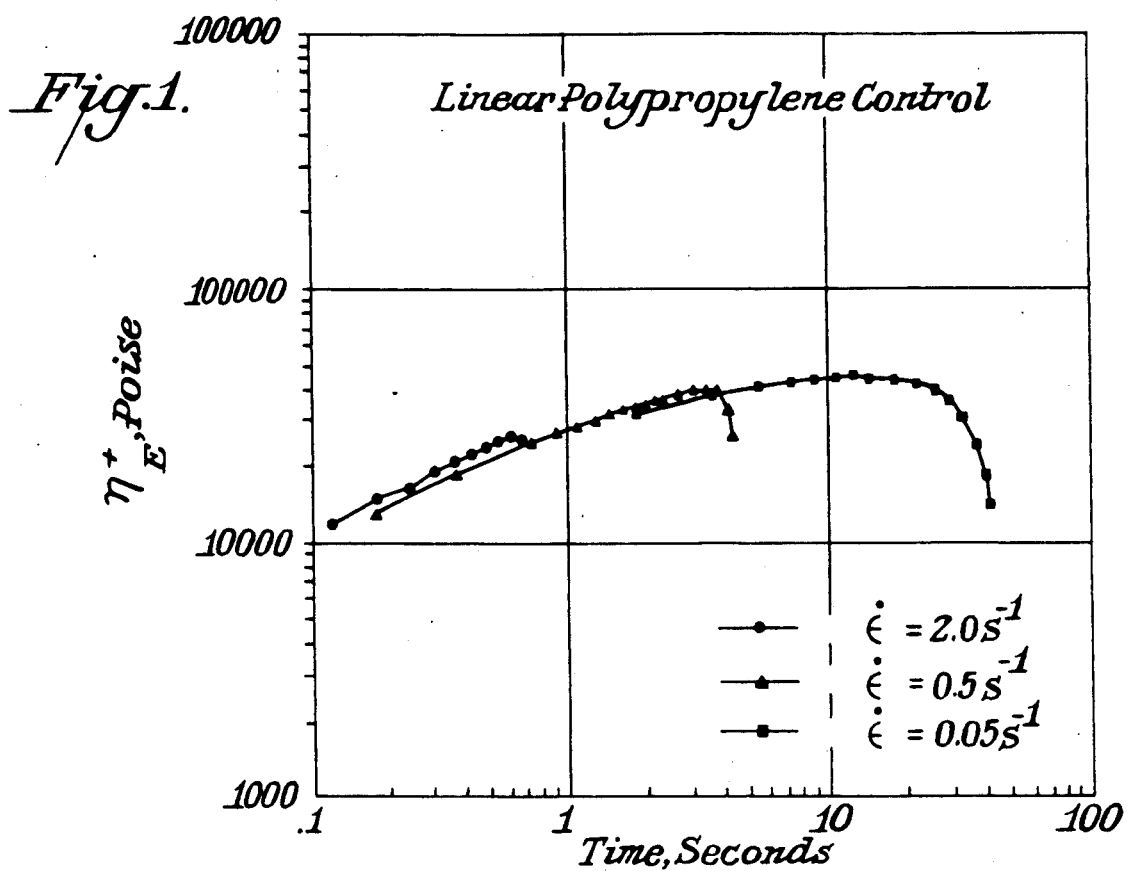
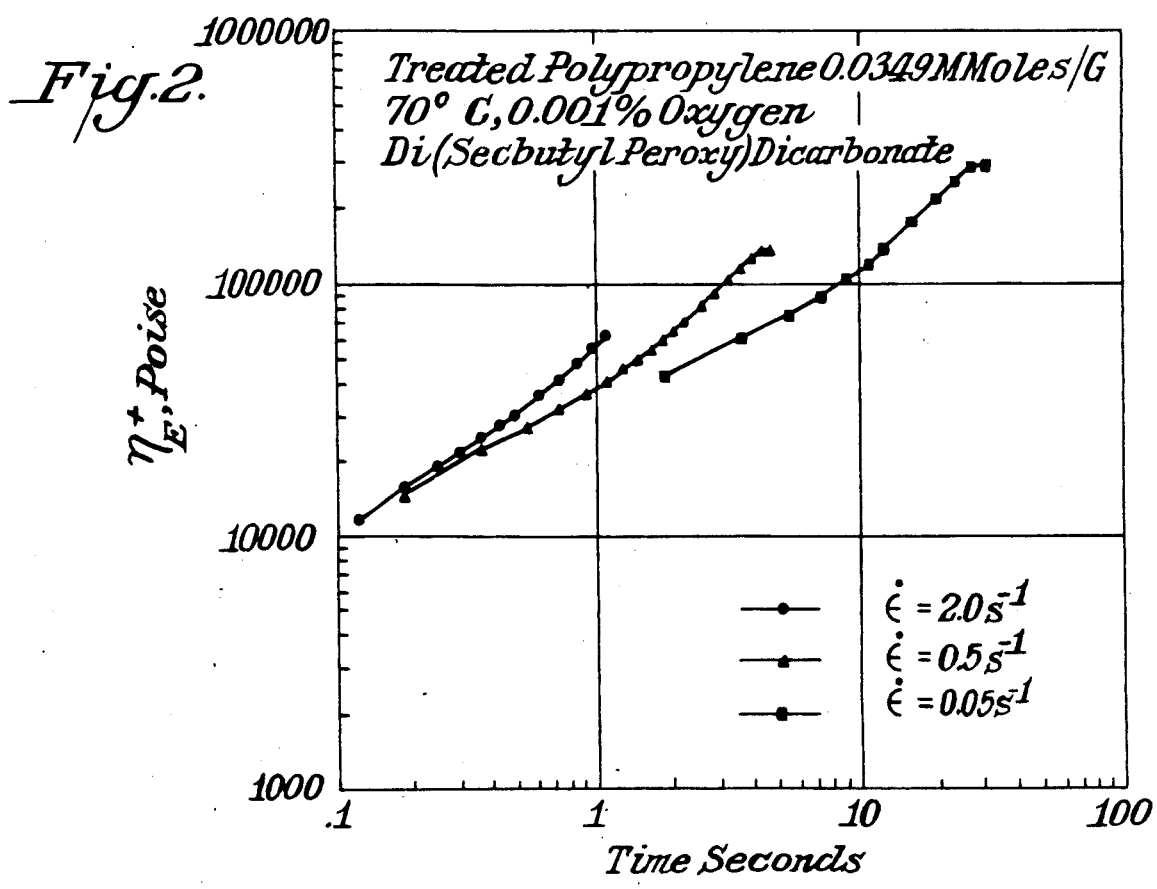

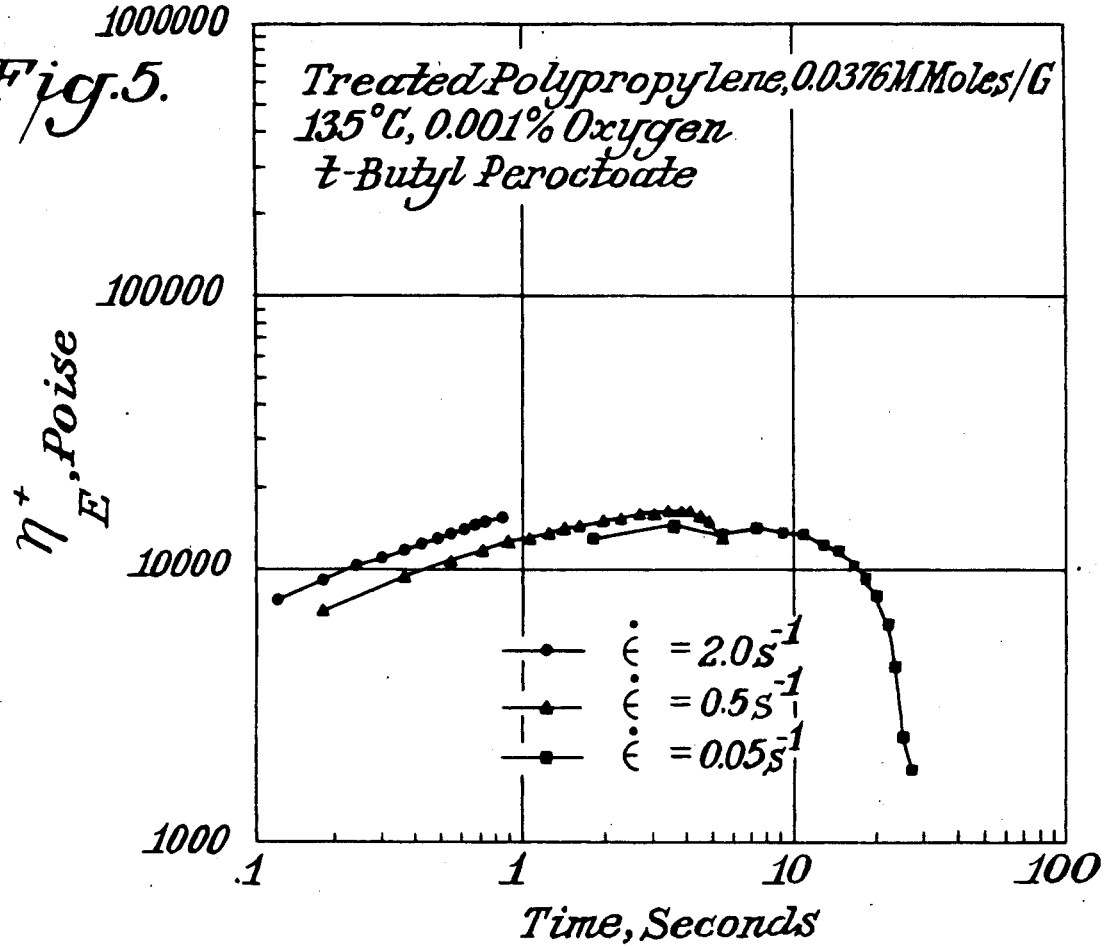

PROCESS FOR MAKING A PROPYLENE POLYMER WITH FREE-END LONG CHAIN BRANCHING AND USE THEREOF

FIELD OF THE INVENTION

This invention resides in the chemical arts. More particularly, it relates to the chemical art having to do with synthetic resins derived from 1- or alpha olefins. Specifically, it relates to a process for producing synthetic resins formed by the polymerization of propylene alone or with other alpha olefins.

BACKGROUND OF THE INVENTION

The synthetic resin formed by the polymerization of propylene as the sole monomer is called polypropylene. While "polypropylene" has been used from time to time in the art to include a copolymer of propylene and a minor amount of another monomer, such as ethylene, the term is not so used herein.

The polypropylene of commerce is a normally solid, predominantly isotactic, semi-crystalline, thermoplastic polymer mixture formed by the polymerization of propylene by Ziegler-Natta catalysis. In such catalysis the catalyst is formed by an inorganic compound of a metal of Groups I-III of the Perodic Table, such as, an aluminum alkyl, and a compound of a transition metal of Groups IV-VIII of the Periodic Table, such as, a titanium halide). Typically the crystallinity of polypropylene thus produced is about 60% as measured by X-ray diffraction. As used herein, semi-crystalline means a crystallinity of at least about 5–10% as measured by X-ray diffraction. Also, the typical weight average molecular weight (Mw) of the normally solid polypropylene of commerce is 100,000–4,000,000, while the typical number average molecular weight (Mn) thereof is 40,000–100,000. Moreover, the melting point of the normally solid polypropylene of commerce is about 162° C.

Although the polypropylene of commerce has many desirable and beneficial properties, it is deficient in melt strength or strain hardening (an increase in resistance to stretching during elongation of the molten material). Thus it has a variety of melt processing shortcomings, including the onset of edge weave during high speed extrusion coating of paper or other substrates, sheet sag and local thinning in melt thermoforming, and flow instabilities in co-extrusion of laminate structures. As a result, its use has been limited in such potential applications as, for example, extrusion coating, blow molding, profile extrusion, and thermoforming.

On the other hand, low density polyethylene made by a free radical process has desirable melt rheology for applications that require melt strength or strain hardening properties. Such low density polyethylene is believed to have these properties because the polymer molecules are non-linear. The molecules are chains of ethylene units that have branches of ethylene units of varying lengths. This non-linear structure occurs because of typical free radical inter- and intra-molecular transfer followed by further subsequent polymerization.

Low molecular weight, amorphous (predominantly atactic) polypropylene with a branched molecular structure is known in the prior art. See Fontana, Kidder and Herold, Ind. & Eng. Chem., 44 (7), 1688–1695 (1952), and the U.S. Pat. No. 2,525,787, to Fontana et al. It is disclosed as having been made by Friedel-Crafts catalysis. However, the molecular weight (weight average) of this polypropylene is at most about 20,000, the polymer is described as having normal (at 20° C.) viscosity ranging from that of a light lubricating oil to that of a heavy oil or even resins of plastic or semi-solid nature, and its utility is reported to be as a blending agent and viscosity index improver for lubricating oils.

The crystalline polypropylene of commerce, however, is linear. That is, the polymer molecules are chains of propylene units without branches of propylene units. The reason is that in Ziegler-Natta catalysis secondary free radical reactions such as occur in the free radical polymerization of ethylene are highly improbable, if not non-existent.

Some effort has been made in the art to overcome the melt strength deficiency of the polypropylene of commerce.

One approach, as reflected in the U.S. Pat. No. 4,365,044, to Liu, and cited references thereof, has been to blend the linear polypropylene of commerce with a low density polyethylene which has the desirable melt strength or strain hardening properties alone or together with other polymeric substances. Although the blend approach has met with some success, it is not preferred.

Another approach to improve the melt properties of linear polypropylene is disclosed in the U.S. Pat. No. 3,349,018. According to this patent, linear polypropylene is degraded by subjecting it in air to ionizing radiation at a total dose from about 0.01 to about 3 megareps (equivalent to about 0.012 to about 3.6 megarads), but less than a dose at which gelation is caused. This patent discloses that radiation degraded linear polypropylene can be extruded and drawn at much higher linear speeds without the occurrence of draw resonance or surging. However, as can be determined from the patent, particularly Example VI, the neck-in of the in-air radiated linear polypropylene is actually greater than the neck-in of the non-irradiated linear polypropylene.

There are a number of references that disclose the ionizing radiation treatment of linear polypropylene. In the main, these references describe the resulting polymer either as degraded, as a result of chain scisson, or as cross-linked, as a result of polymer chain fragments linking together linear polymer chains. European patent application publication no. 190,889, published Aug. 13, 1986, describes high-molecularweight, long-chain branched polypropylene made by irradiating linear polypropylene with high-energy ionizing radiation. The free-end branched polymer is gel-free and has strain hardening elongational viscosity.

Likewise there are a number of references which disclose the peroxide treatment of linear polypropylene. Such references disclose either degradation or crosslinking of polypropylene by thermal or u.v. decomposition of the peroxides. Typically, degradation is the predominant reaction. Degradation or visbreaking of polypropylene by the thermal decomposition of peroxides is the common method used to narrow the molecular weight of the linear crystalline polypropylene. Generally, the resultant product consists of linear chains of polypropylene having both lower weight and number average molecular weights. Typically, the reaction is conducted at a temperature in excess of the melting point of polypropylene, i.e. in excess of 162° C. However, when crosslinking is initiated by u.v. radiation, lower temperatures can be used. (See, Chodak, I. and Lazar, M., Effects of the Type of Radical Initiator on Crosslinking of Polypropylene, Die Angewandte Makromoledulare Chemie, 106, 153-160 (1982)) However, as is pointed out in this article, the lower temperatures decrease the decomposition rate of the peroxide initiator thereby leading to lower concentrations of the radical fragments of polypropylene, and decrease the mobility of these radical fragments of polypropylene thereby making recombination difficult. Although lower temperature is not defined in the article, the lowest temperature reported is in connection with crosslinking by u.v. irradiation of peroxides is 10° C., with the optimal temperature for effective crosslinking being 65°-80° C.

SUMMARY OF THE INVENTION

This invention provides a practical process for converting normally solid, amorphous to predominantly isotactic, semi-crystalline, linear polypropylene into normally solid, gel-free, amorphous to predominantly isotactic, semi-crystalline, polypropylene, the molecular chains of which have a substantial amount of free-end long branches of propylene units. More particularily, it comprises a process for converting normally solid, gel-free, amorphous to pre-dominantly isotactic, semi-crystalline, polypropylene into normally solid, gel-free, amorphous to predominantly isotactic, semi-crystalline, polypropylene having a branching index of less than 1 and having significant strain hardening elongational viscosity.

More broadly this invention comprises a process for converting normally solid, high molecular weight, gel-free, propylene polymer material, into a normally solid, high molecular weight, gel-free propylene polymer material having a branching index of less than 1 and having significant strain hardening elongational viscosity.

As used herein, "propylene polymer material" means propylene polymer material selected from the group consisting of (a) homopolymers of propylene, (b) random copolymers of propylene and an olefin selected from the group consisting of ethylene and $C_4$-$C_{10}$ 1-olefins, provided that, when said olefin is ethylene, the maximum polymerized ethylene content is about 5 (preferably about 4) % by weight, when said olefin is a $C_4$-$C_{10}$ 1-olefin, the maximum polymerized content thereof is about 20 (preferably about 16) % by weight, and (c) random terpolymers of propylene and 1-olefins selected from the group consisting of ethylene and $C_4$-$C_8$ 1-olefins, provided that the maximum polymerized $C_4$-$C_8$ 1-olefin content is about 20 (preferably about 16) % by weight, and when ethylene is one of said 1-olefins, the maximum polymerized ethylene content is about 5 (preferably about 4) % by weight. The $C_4$-$C_{10}$ 1-olefins include the linear and branched $C_4$-$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like.

Also, as used herein, "high molecular weight" means weight average molecular weight of at least about 100,000.

The branching index quantifies the degree of long chain branching. In preferred embodiments the branching index is preferably less than about 0.9 and most preferably about 0.3-0.5. It is defined by the equation:

$$g' = \frac{[IV]_{Br}}{[IV]_{Lin}}\bigg|_{M_w}$$

in which g' is the branching index, $[IV]_{Br}$ is the intrinsic viscosity of the branched propylene polymer material and $[IV]_{Lin}$ is the intrinsic viscosity of a normally solid, predominantly isotactic, semi-crystalline, linear propylene polymer material of substantially the same weight average molecular weight, and, in the case of copolymers and terpolymers, substantially the same relative molecular proportion or proportions of monomer units.

Intrinsic viscosity, also known as the limiting viscosity number, in its most general sense is a measure of the capacity of a polymer molecule to enhance the viscosity of a solution. This depends on both the size and the shape of the dissolved polymer molecule. Hence, in comparing a non-linear polymer with a linear polymer of substantially the same weight average molecular weight, it is an indication of configuration of the non-linear polymer molecule. Indeed, the above ratio of intrinsic viscosities is a measure of the degree of branching of the non-linear polymer. A method for determining intrinsic viscosity of propylene polymer material is described by Elliott et al., J. App. Poly. Sci.,14, pp 2947-2963 (1970). In this specification the intrinsic viscosity in each instance is determined with the polymer dissolved in decahydronaphthalene at 135° C.

Weight average molecular weight can be measured by various procedures. However, the procedure preferably used here is that of low angle laser light scattering photometry, which is disclosed by McConnell in Am. Lab., May 1978, in the article entitled "Polymer Molecular Weights and Molecular Weight Distribution by Low-Angle Laser Light Scattering".

Elongational viscosity is the resistance of a fluid or semifluid substance to elongation. It is a melt property of a thermoplastic material, that can be determined by an instrument that measures the stress and strain of a specimen in the melt state when subjected to tensile strain at a constant rate. One such instrument is described, and shown in FIG. 1 of Munstedt, J. Rheology, 23, (4), 421-425, (1979). A commercial instrument of similiar design is the Rheometrics RER-9000 extensional rheometer. Molten, high molecular weight, linear propylene polymer material exhibits elongational viscosity which, as it is elongated or drawn at a constant rate from a relatively fixed point, tends to increase for a distance dependent on the rate of elongation, and then to decrease rapidly until it thins to nothing—so-called ductile or necking failure. On the other hand, molten propylene polymer material of this invention, that is of substantially the same weight average molecular weight and at substantially the same test temperature as the corresponding molten, high molecular weights, linear, propylene polymer material, exhibits elongational viscosity which, as it is elongated or drawn from a relatively fixed point at substantially the same rate of elongation tends to increase over a longer distance, and to break or fail by fracture—so-called brittle or elastic failure. These characteristics are indicative of strain hardening. Indeed, the more long chain branching the propylene polymer material of this invention has the greater the tendency of the elongational viscosity to increase as the elongated material approaches failure. This latter tendency is most evident when the branching index is less than about 0.8. The process comprises:

(1) mixing a low decomposition temperature peroxide with a linear propylene polymer material, which material is at room temperature (about 23° C.) to 120° C., in a mixing vessel in the substantial absence of atmospheric oxygen or its equivalent, (2) heating or maintaining the resulting mixture in the substantial absence of atmospheric oxygen or its equivalent at room temperature (about 23° C.) to 120° C. for a period of time sufficient for decomposition of the peroxide, for a substantial amount of fragmentation of the linear propylene polymer material to occur, and for a significant amount of long chain branches to form, but insufficient to cause gelation of the propylene polymer material;

(3) treating the propylene polymer material in the substantial absence of atmospheric oxygen or its equivalent to deactivate substantially all the free radicals present in said propylene polymer material.

The linear propylene polymer material treated according to the process of this invention can be any normally solid, amorphous to predominantly isotactic, semi-crystalline linear propylene polymer material. The treatment with low decomposition temperature peroxides according to this invention generally produces an end product, i.e., the desired substantially branched propylene polymer material, having a net increase in weight average molecular weight over the starting material However, since peroxide radicals can cause chain scissions, notwithstanding the recombination of the chain fragments to reform chains and to form branches, there can be a net reduction in the weight average molecular weight between the starting propylene polymer material and the end product. In general, the intrinsic viscosity of the linear propylene polymer starting material, which is indicative of its molecular weight, should be in general about 1-25, and preferably 2-6, to result in an end product with an intrinsic viscosity of 1-6, and preferably 2-4. However, linear propylene polymer material with intrinsic viscosities higher than these general values are within the broader scope of this invention.

Results obtained in recent investigations have indicated that in the normally solid, predominantly isotactic, semi-crystalline linear polypropylene treated according to the process of this invention, the long chain free end branching is confined for the most part to the amorphous fraction of the semi-crystalline polypropylene. This fraction comprises normally solid atactic polypropylene as well as normally solid crystallizable, but not crystallized, stereoregular polypropylene. Hence, the linear propylene polymer material treated according to the process of this invention in its broader aspects can be normally solid amorphous propylene polymer material with little or no crystalline propylene polymer content. Indeed, it can be normally solid amorphous propylene polymer material with little or no crystallizable propylene polymer content, i.e., atactic polypropylene, or normally solid, high molecular weight, amorphous, linear propylene polymer material with little or no atactic propylene polymer content, i.e., crystallizable, but not crystallized, stereoregular propylene polymer. Furthermore, this invention in its broader aspects comprises the propylene polymer product resulting from the treatment of normally solid, high molecular weight, linear, amorphous propylene polymer material by said process.

The high molecular weight, linear propylene polymer material treated according to the process of this invention under the broadest concepts of the process can be in any physical form, for example, finely divided particles, pellets, film, sheet, and the like. However, in preferred embodiments of the process of this invention, the linear propylene polymer material is in a finely divided condition with satisfactory results being obtained at an average particle size of about 60 mesh US screen size. In these embodiments it is a powder which commercially is referred to as flake.

The active oxygen content of the environment in which the three process steps are carried out is a critical factor. The expression "active oxygen" herein means oxygen in a form that will react with the peroxide treated polypropylene. It includes molecular oxygen (which is the form of oxygen normally found in air). The active oxygen content requirement of the process of this invention can be achieved by use of vacuum or by replacing part or all of air in the environment by an inert gas such as, for example, nitrogen or argon.

Linear polypropylene immediately after it is made is normally substantially free of active oxygen. Therefore, it is within the concepts of this invention to follow the propylene polymerization and polymer work-up steps (when the polymer is not exposed to air) with the process of this invention. However, in most situations the linear polypropylene will have an active oxygen content because of having been stored in air, or for some other reason. Consequently, in the preferred practice of the process of this invention the finely divided linear polypropylene is first treated to reduce its active oxygen content. A preferred way of doing this is to introduce the linear polypropylene into a bed of the same blown with nitrogen, the active oxygen content of which is equal to or less than about 0.004% by volume. The residence time of the linear polypropylene in the bed generally should be at least about 5 minutes for effective removal of active oxygen from the interstices of particles of the linear polypropylene, and preferably long enough for the polypropylene to be in equilibrium with the environment.

Between this preparation step and up to and including the deactivation or quenching step, the prepared linear polypropylene should be maintained in an environment in which the active oxygen concentration is less than about 15%, preferably less than 5%, most preferably less than or equal to 0.004%, by volume of the environment. In addition, temperature of the linear polypropylene should be kept above the glass transition temperature of the amorphous fraction of the polypropylene, if any is present, and because it usually is, generally at less than about 40° C. and preferably at about 25° C. (room temperature). In any event, the temperature must be above 0° C.

From prior to the formation of the initial free radicals through to and including the deactivation step, the active oxygen concentration of the environment preferably is less than about 5% by volume, and more preferably less than about 1% by volume. The most preferred concentration of active oxygen is less than or equal to 0.004% by volume.

The amount of low decomposition temperature peroxide used is critical. The greater the amount, the greater the branching and the greater the increase in molecular weight. However, it is likewise desirable for all of the low decomposition temperature peroxide used to be consumed so that you do not get undersirable degradation during storage. If too little is used, you do not get enough branching. The amount of low decomposition temperature peroxide should range from 0.005 to 0.05 mmoles/g propylene polymer starting material, preferably about 0.01 to 0.05, most preferably about 0.02 to 0.05.

In the second step of the process of this invention, the temperature at which the resulting mixture is heated or maintained must be sufficient to decompose the low decomposition temperature peroxide and low enough to favor the recombination of the polymer fragments. Generally for a propylene polymer material, the temperature can range from room temperature to 120° C., preferably from about 60° to 110° C., most preferably from about 70° to about 105° C. If a temperature in excess of about 120° C., is used, a product with little or no branching will be obtained, i.e. an essentially linear polymer. Temperatures below room temperature likewise do not produce any significant degree of branching.

The decomposition rate of the peroxide used is critical. The decomposition rate is expressed in half lives of the peroxide initiator at a given temperature. Half life is the time period required at the specified temperature to diminish the initial concentration to one half the value of the initial concentration. Typically, the half life is measured in an organic solvent solution having a concentration approximating the intended use concentration in the propylene polymer of interest. The required half life varies with the reaction temperature employed during the second step of the process. In the temperature range from about 90° to 120° C., the half life of the peroxide must be less than or equal to 5 minutes, preferably less than or equal to 3 minutes, most preferably less than or equal to 2 minutes. In the temperature range from about 60° to about 90° C., the half life must be less than or equal to 40 minutes, preferably less than or equal to 30 minutes, most preferably less than or equal to 20 minutes. In the temperature range from about room temperature to about 60° C., the half life must be less than or equal to 60 minutes, preferably less than or equal to 50 minutes, most preferably less than or equal to 40 minutes. Half lives in excess of those specified will lead to a product with little or no branching, i.e., an essentially linear product.

The second step of the process of this invention should be performed in a period of time, depending on the half life of the low decomposition temperature peroxide used. The reaction time of the second step is typically 5-15 half lives, preferably 5-10 half lives, most preferably 5-8 half lives of the low decomposition temperature peroxide used, generally in the range from about 100 minutes to 900 minutes, preferably 100 minutes to 600 minutes, most preferably 100 minutes to 480 minutes in the temperature range from room temperature to 60° C., and from 10 minutes to 600 minutes, preferably 10 minutes to 400 minutes, most preferably 10 minutes to 160 minutes in the temperature range from 60° to 90° C., and from 5 minutes to 75 minutes, preferably 5 minutes to 45 minutes, most preferably 5 minutes to 30 minutes in the temperature range from 90° to 120° C. A minimum time is needed to decompose the peroxide, to allow for sufficient migration of propylene polymer chain fragments to free radical sites and for combination at the free radical sites to form complete chains, or to form long branches on chains. Periods of time in excess of those specified do not provide any additional long chain branching.

Suitable low decomposition temperature peroxides include di(sec-butyl)peroxy dicarbonate, bis(2-ethoxy)-peroxy dicarbonate, di-cyclohexylperoxy dicarbonate, di-n-propylperoxy dicarbonate, di-n-butylperoxy dicarbonate, di-secbutylperoxy dicarbonate, di-isopropylperoxy dicarbonate, t-butylperoxy neodecanoate, t-amylperoxy neodecanoate, and t-butylperoxy pivalate.

The application of heat can be by any conventional means or by introducing the peroxide/propylene polymer material mixture into a fluidized bed in which the fluidizing medium is, for example, nitrogen or other inert gas. The bed is established and maintained in a temperature range of at least room temperature up to 120° C., preferably 60° to 110° C., most preferably 70° to 105° C., with the residence time of the mixture dependent upon the temperature, but generally in the range of 10 minutes to 900 minutes, preferably 20 minutes to 600 minutes, most preferably 30 minutes to 120 minutes. In all cases, the residence time should be equal to or greater than 5 half lives of the low decomposition temperature peroxide used at the reaction temperature.

The third step of the process, the free radical deactivation or quenching step, can be performed by the application of heat or by the addition of an additive that functions as a free radical trap, such as, for example, methyl mercaptan.

In one embodiment of the process, the third step comprises heating the peroxide treated propylene polymer material at about 130° C. to about 150° C. The application of heat can be by any conventional means, such as by extrusion, or by introducing the peroxide treated propylene polymer material into a fluidized bed in which the fluidizing medium is, for example, nitrogen or other inert gas. The bed is established and maintained in a temperature range of at least about 130° C. up to about 150° C., preferably 140° to 150° C., most preferably 150° C., with the residence time of the treated polypropylene in the fluid bed being from 5 minutes to about 120 minutes, preferably 10 minutes to about 90 minutes, with about 30 minutes being optimum when only the low decomposition temperature peroxide is used. Generally, the resulting product is allowed to cool by standing at room temperature or can be conveyed by some conveying means to another area where it is allowed to cool by standing at room temperature.

In another embodiment two or more peroxide activators can be used having varying decomposition temperatures when the increased melt shear viscosity which results from the treatment of the propylene polymer according to this invention with a low decomposition temperature peroxide is not desirable. In such instances, the peroxide activator is a combination of a low decomposition temperature or less stable peroxide, i.e. one that decomposes with a half life of less than or equal to 5 minutes in the temperature range from about 90° C. to 120° C., or less than 40 minutes in the temperature range from about 60° C. to about 90° C., or less than 60 minutes in the temperature range from room temperature to about 60° C., and a more stable peroxide or high decomposition temperature peroxide, i.e. a peroxide with a decomposition half life of greater than or equal to 20 minutes at 120° C., but less than or equal to 60 minutes at about 130° C. to 150° C. The use of such a peroxide activator combination allows one to control both the melt shear viscosity and the extent of branching. The decomposition of the less stable or low decomposition temperature peroxide takes place in the second step and provides the long chain branching. The decomposition of the high decomposition temperature peroxide and the degradation of the branched propylene polymer material formed in the second step takes place in the third step when the aforementioned peroxide combination is used. The period of time the branched propylene polymer material of the second step is heated in third step must be sufficient to deactivate any free radicals present from the low decomposition temperature peroxide and to decompose the high decomposition temperature peroxide and then to deactivate any free radicals remaining from the high decomposition temperature peroxide after the desired degradation is achieved, but insufficient to cause gelation of the branched propylene polymer material. Typically this is from 10 minutes to about 300 minutes, preferably about 20 minutes to about 120 minutes, most preferably about 90 minutes.

The low decomposition temperature and high decomposition temperature peroxide may be added as a mixture, separately but simultaneously or consecutively before any heat is applied, during the application of heat or after the propylene polymer material has been brought up to the temperature to be used in the second step. Alternatively, the low decomposition temperature peroxide may be added before any heat is applied, during the application of heat or after the propylene polymer material has been brought up to the temperature to be used in the second step and the high decomposition peroxide added before any heat is applied, during the application of heat or after the propylene polymer material has been brought up to the temperature to be used in the third step.

The low decomposition temperature peroxide or the high decomposition temperature peroxide or both can be introduced neat or in a substantially inert liquid medium, such as xylene or mineral spirits. Typically, the concentration of the peroxide in a liquid medium is from 10% to 99%, with the amount being used calculated on the active basis. Preferably, the low decomposition temperature peroxide, or the combination of a low decomposition and high decomposition temperature peroxide, is added to the propylene polymer material after said material has been established and maintained at the temperature to be employed in the second step for at least 20 seconds.

The use of both a low and high decomposition temperature peroxide provides a reduction in molecular weight without sacrificing the preformed long chain branches. It is essential that the high decomposition temperature peroxide be used in such an amount that it is essentially completely exhausted, and that the free radicals resulting from the decomposition thereof are deactivated in the third step. Hence, the concentration of the more stable peroxide component is critical, with the amount ranging from 0.002 to 0.1 mmoles/g propylene polymer starting material, preferably 0.008 to 0.08, most preferably 0.01 to 0.05. The reaction time of the third step when a mixture of a low decomposition temperature peroxide and a high decomposition temperature peroxide are used is typically 3-20 half lives, preferably 10-15 half lives of the high decomposition temperature peroxide used.

Suitable high decomposition temperature peroxides include 2,5-dimethyl-2,5-bis(t-butylperoxy) hexane, bis(t-butylperoxy-isopropyl) benzene, dicumyl peroxide, 4,4-di-t-butylperoxy-n-butyl valerate, t-amylperoxy benzoate, t-butylperoxy benzoate, 2,2-di-t-butylperoxy butane, t-butyl peroxy-3,5,5-trimethyl hexanoate, t-butylperoxy isopropyl carbonate and 1,1-di-t-butylperoxy cyclohexane.

The product thus obtained is a normally solid, gel-free, propylene polymer material having a molecular weight greater than the molecular weight of the propylene polymer starting material and characterized by strain hardening, particularly if only a low decomposition temperature peroxide is used to prepare the propylene polymer product. If the combination of a low decomposition temperature peroxide and a high decomposition temperature peroxide is used, you can obtain a normally solid, gel-free propylene polymer material characterized by strain hardening and having a molecular weight higher or somewhat lower than the molecular weight of the propylene polymer starting material.

Although the process of the invention can be carried out on a batch basis, preferably it is performed on a continuous basis.

The second and third steps can be performed by using a staged fuidized bed system.

After deactivation of the free radicals, the resultant propylene polymer material is discharged into the atmosphere.

This invention, in still another aspect, comprises the extensional flow use of the strain hardening propylene polymer material of this invention. Extensional flow occurs when the propylene polymer material in the molten condition is pulled in one or more directions at a rate faster than it would normally flow in those directions. It happens in extrusion coating operations in which a melted coating material is extruded on to a substrate such as a moving web of paper or metal sheet, and the extruder or substrate is moving at a higher rate than the extrusion rate. It takes place in film production when the molten film material is extruded and then stretched to the desired thinness. It is present in thermoforming operations in which a molten sheet is clamped over a plug mold, vacuum is applied and the sheet is pushed into the mold. It occurs in the manufacture of foamed articles in which molten propylene polymer material is expanded with a foaming agent. The strain hardening propylene polymer material of this invention is particularly useful as part of (for example, from as little as 0.5% by weight to as much as 95% or more by weight) or, particulary in the case of strain hardening, predominantly isotactic, semi-crystalline propylene polymer material, substantially all of the molten plastic material used in these and other melt processing methods (for example, profile extrusion, as in the melt spinning of fibers and in melt blown fiber processes) for making useful articles. In the case of the strain hardening amorphous propylene polymer material of this invention, it is particularly useful when blended with normally solid, predominantly isotactic, semi-crystalline linear propylene polymer material for use in melt processing and other operations for making useful articles.

The best mode now contemplated of carrying out the invention is illustrated by the following examples.

EXAMPLE 1

This examples illustrates the non-linear propylene polymer of this invention, and a process for making it.

In this example 5 grams of a finely divided (flake) polypropylene of commerce, having a conventional phenolic antioxidant content of about 0.001% by weight, and characterized by a nominal melt flow rate (dg/min., ASTM Method D 1238, Condition L) of 2.5 and density (g/cm$^3$, ASTM method D 792A-2) of 0.902 is added to a vessel equipped with a stirrer. The vessel is sealed and sparged with argon with agitation until less than 100 ppm residual oxygen is obtained. When the sparging is complete, 0.0079 mmoles of di(sec-butyl) peroxy dicarbonate having a half life at 100° C. of 0.5 minutes is introduced into the vessel. The polypropylene and peroxide are mixed until a homogeneous mixture is obtained (approx. 10 minutes). The vessel is then placed in a constant temperature bath at 100° C. for 10 minutes with agitation. The vessel is then tranferred to a second constant temperature bath at 150° C. and maintained at that temperature for 30 minutes with agitation. The oxygen level in the reactor was maintained at less than 100 ppm throughout the reaction period. The vessel is then removed and the resulting product recovered after being allowed to cool by standing at room temperature.

Properties of the end product of Example 1 and those of a control, a linear polypropylene of commerce, are summarized in Table I.

EXAMPLES 2-5

These examples illustrate other embodiments of the non-linear propylene polymer of this invention.

The formulation and procedure of Example 1 is used except that the amount of the peroxide, temperatures and times are as indicated in Table I. The properties of the resulting products of examples 2-5 are set forth in Table I.

EXAMPLES 6-9

These examples illustrate other embodiments of the non-linear propylene polymer of this invention and another embodiment of the process for making same.

The formulation and procedure of Example 1 is used except that a combination of the di(sec-butyl) peroxy dicarbonate and 2,5-dimethyl-2,5-bis(t-butylperoxy) hexane (98% purity), the latter having a half life at 100° C. of 40 hours and at 150° C. of about 30 minutes, is used. The amount of the two peroxides used, temperatures and times are as indicated in Table 1. The properties of the resulting products of examples 6-9 are set forth in Table I.

TABLE I

| Examples | Peroxide, (mmoles/g polymer) | Temperature, °C. Time, min | Mw[1] | IV, dl/g | B.I.[2] | Complex Shear Viscosity $\eta^*$ @ 0.01 r/s (poise)[3] |
|---|---|---|---|---|---|---|
| Control | none | — | 460,000 | 2.98 | 0.96 | 3.1 × 10$^5$ |
| 1 | .0079[4] | 100–10 150–30 | 480,000 | 2.95 | 0.91 | 4.1 × 10$^5$ |
| 2 | 0.0203[4] | 100–10 150–30 | 600,000 | 3.00 | 0.78 | 7.4 × 10$^5$ |
| 3 | 0.0280[4] | 100–10 150–30 | 630,000 | 2.96 | 0.74 | 7.1 × 10$^5$ |
| 4 | 0.0350[4] | 100–10 150–30 | 790,000 | 3.18 | 0.66 | 1.1 × 10$^6$ |
| 5 | 0.0467[4] | 100–10 150–30 | 1,500,000 | 3.14 | 0.39 | 1.2 × 10$^6$ |
| 6 | 0.035[4] | 100–10 150–90 | 780,000 | 3.08 | 0.64 | 9.9 × 10$^5$ |
| 7 | 0.035[4] 0.008[5] | 100–10 150–90 | 560,000 | 2.47 | 0.68 | 1.0 × 10$^5$ |
| 8 | 0.035[4] 0.016[5] | 100–10 150–90 | 600,000 | 2.35 | 0.61 | 3.3 × 10$^3$ |
| 9 | 0.035[4] 0.040[5] | 100–10 150–90 | 570,000 | 2.08 | 0.56 | 3.8 × 10$^2$ |

[1] Determined with Chromatix KMX-6 low angle laser light scattering at 135° C. in 1,2,4-trichlorobenzene.
[2] Branching index.
[3] Rheometrics mechanical spectrometer.
[4] Di(sec-butyl) peroxydicarbonate half life at 100° C., 30 seconds
[5] 2,5-dimethyl-2,5-bis(t-butylperoxy) hexane half life at 100° C., 40 hours at 150° C.: approx. 30 minutes

EXAMPLE 10

This example illustrates another embodiment of the non-linear propylene polymer of this invention.

The polypropylene of Example 1 (200 g) is introduced into a glass reactor equipped with a stirrer. The reactor is sealed and sparged with nitrogen gas with agitation until less than 10 ppm residual oxygen is obtained. During the sparging, the reactor is placed in a constant temperature bath at 70° C. The temperature of the polymer is monitored as it is heated. The temperature of the polymer is held at 70° C. for 15 minutes with agitation and then 0.0349 (active basis) mmoles/g polymer of di(sec-butyl)peroxy dicarbonate (30% solution in xylene), having a half life at 70° C. of 20 minutes, is added to the reactor and mixed with the polymer. The polymer and peroxide mixture is maintained at 70° C. for 2 hours with agitation. The oxygen level in the reactor was maintained at less than 10 ppm throughout the reaction period. The reactor is then sparged with a flow of hot nitrogen gas to raise the temperature of the contents of the reactor to 140° C. over the course of approximately 40 minutes. This temperature is maintained for 30 minutes with agitation. The reactor is then sparged with a flow of room temperature nitrogen gas to cool the product to less than 60° C. The reactor is opened and 196.4g of product recovered.

The properties of the product of this example and those of a control, a linear polypropylene of commerce, are set forth in Table II.

EXAMPLES 11-13

Example 11 illustrates another embodiment of the non-linear propylene polymer of this invention. Examples 12 and 13 are comparative examples.

The formulation and procedure of Example 10 is used except that the type of peroxide, amount of peroxide, temperatures and times are as indicated in Table II. Di(sec-butyl)peroxy dicarbonate has a half life at 100° C. of 0.5 minutes, and t-butyl peroctoate (50% solution in mineral spirits) has a half life at 100° C. of 20 minutes and a half life at 135° C. of 0.5 minutes. The properties of the resulting products are set forth in Table II.

TABLE II

| Examples | Peroxide | Peroxide (mmoles/g polymer) | Temperature, °C. Time, min | Melt Flow Rate, dg/min[1] | IV, dl/g | Viscosity, $\eta^*$ @ 0.1 r/s (poise)[2] |
|---|---|---|---|---|---|---|
| Control | none | | — | 2.94 | 2.52 | $1.2 \times 10^5$ |
| 10 | disecbutyl peroxy dicarbonate | 0.0349 | 70–120 140–30 | 1.95 | 2.70 | $1.8 \times 10^5$ |
| 11 | disecbutyl peroxy dicarbonate | 0.0349 | 100–20 140–30 | 2.86 | 2.59 | $1.4 \times 10^5$ |
| 12 | t-butyl- peroctoate | 0.0376 | 100–120 140–30 | 3.63 | 2.34 | $0.94 \times 10^5$ |
| 13 | t-butyl- peroctoate | 0.0376 | 135–20 140–30 | 7.22 | 2.04 | $0.43 \times 10^5$ |

[1]According to ASTM 1238-82, Procedure B
[2]Rheometrics mechanical spectrometer.

The elongational properties of a control sample and of the four materials from Examples 10 to 13 are illustrated in FIGS. 1–5. More particularly, FIGS. 1–5 are plots of elongational viscosity ($\eta^+_E$, poise) versus time (seconds) at the elongation rates (sec$^{-1}$) indicated. These data were obtained on samples of the control and of the Examples 10–13 products with the Rheometrics extensional rheometer (RER-9000). In obtaining the data of FIGS. 1–5, the samples were elongated to failure in the melt at 180° C.

Thus, it will be observed in FIG. 1 for the linear polypropylene control, as the molten material is stretched or elongated, the elongational viscosity generally increases with time, but as the point of failure is approached, it decreases to such point, whereat the failure is ductile in character.

On the other hand, as shown in FIGS. 2 and 3 the products of this invention on stretching exhibit a general increase in the elongational viscosity with time and, as the point of failure is approached, continues to increase dramatically.

Figure 4:
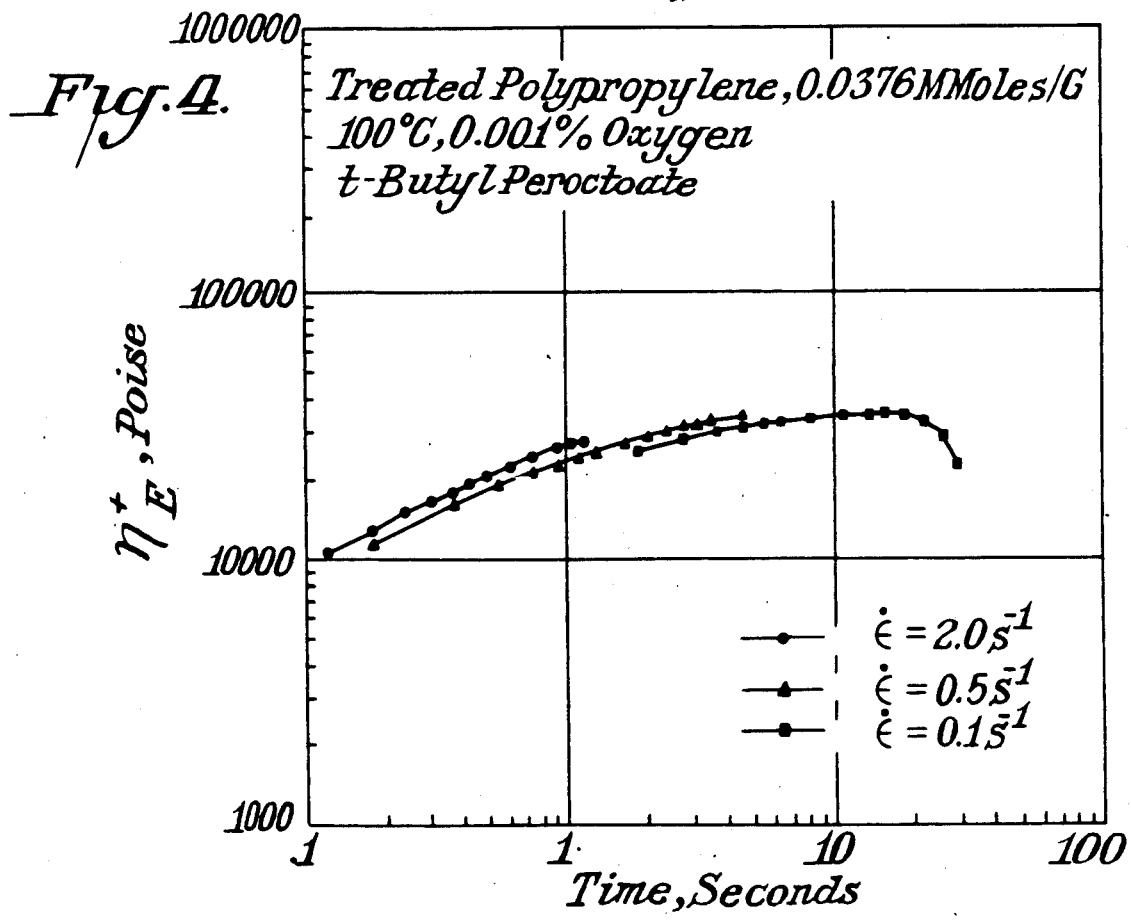

At high reaction temperature or long peroxide half life or both, this strain hardening behavior is not observed and the elongational viscosity of such products resemble that of the linear polypropylene control. This is illustrated in FIGS. 4 and 5 for comparative example 12 and 13 which were treated with t-butyl peroctoate, which is also known as t-butylperoxy-2-ethyl hexanoate.

The propylene polymers of this invention is useful in all melt processing operations in which a propylene polymer material of enhanced melt strength is desired.

Other features, advantages and embodiments of the invention disclosed herein will be readily apparent to those exercising ordinary skill after reading the foregoing disclosures. In this regard, while specific embodiments of the invention had been described in considerable detail, variations and modifications of these embodiments can be effected without departing from the spirit and scope of the invention as described and claimed.

The expression "consisting essentially of" as used in this specification excludes an unrecited substance at a concentration sufficient to substantially adversely affect the essential properties and characteristics of the composition of the matter being defined, while permitting the presence of one or more unrecited substances at concentrations insufficient to substantially adversely affect said essential properties and characteristics.

I claim:

1. A process for making normally solid, gel-free, propylene polymer material with a branching index of less than 1 and with a strain hardening elongational viscosity from normally solid, amorphous to predominantly crystalline propylene polymer material without strain hardening elongational viscosity, which comprises:
   (1) mixing a low decomposition temperature peroxide with a linear propylene polymer material, which material is at room temperature to 120° C., in a mixing vessel in the substantial absence of atmospheric oxygen or its equivalent,
   (2) heating or maintaining the resulting mixture in the substantial absence of atmospheric oxygen or its equivalent at room temperature to 120° C. for a period of time sufficient for decomposition of the peroxide, for a substantial amount of fragmentation of the linear propylene polymer material to occur, and for a significant amount of long chain branches to form, but insufficient to cause gelation of the propylene polymer material;
   (3) treating the propylene polymer material in the substantial absence of atmospheric oxygen or its equivalent to deactivate substantially all the free radicals present in said propylene polymer material.

2. A process according to claim 1 in which said amorphous to predominantly crystalline propylene polymer material is a normally solid, gel-free, predominantly isotactic, semi-crystalline polypropylene.

3. A process according to claim 1 in which the low decomposition temperature peroxide has a half life of less than or equal to 5 minutes in the temperature range from about 90° C. to 120° C., or less than 40 minutes in the temperature range from about 60° C. to about 90° C., or has a half life of less than 60 minutes in the temperature range of room temperature to about 60° C.

4. A process according to claim 3 wherein the low decomposition temperature peroxide is selected from the group consisting of di(sec-butyl)peroxy dicarbonate, bis(2-ethoxy)peroxy dicarbonate, di-cyclohexyl-peroxy dicarbonate, di-n-propyl-peroxy dicarbonate, di-n-butylperoxy dicarbonate, di-sec-butylperoxy dicarbonate, di-isopropylperoxy dicarbonate, t-butylperoxy neodecanoate, t-amylperoxy neodecanoate and t-butyl-peroxy pivalate.

5. A process according to claim 1 in which the half life of the low decomposition temperature peroxide is about 10 seconds to about 5 minutes at the temperature employed in step (2).

6. A process according to claim 1 in which the temperature of step (2) is 60°–110° C.

7. A process according to claim 1 in which the temperature is 70°–105° C.

8. A process according to claim 1 in which the concentration of the low decomposition temperature peroxide is from 0.005 to 0.05 mmoles/g propylene polymer starting material.

9. A process according to claim 3 in which the concentration of the low decomposition temperature peroxide is from 0.005 to 0.05 mmoles/g propylene polymer starting material.

10. A process according to claim 1 wherein the propylene polymer material is established and maintained at the temperature to be used in step (2) for at least 20 seconds prior to the addition of the low decomposition temperature peroxide.

11. A process for making normally solid, gel-free, propylene polymer material with a branching index of less than 1 and with a strain hardening elongational viscosity from normally solid, amorphous to predominantly crystalline propylene polymer material without strain hardening elongational viscosity, which comprises:
   (1) mixing a low decomposition temperature peroxide and a high decomposition temperature peroxide with a linear propylene polymer material, which material is at room temperature to 120° C., in a mixing vessel in the substantial absence of atmospheric oxygen or its equivalent,
   (2) heating or maintaining the resulting mixture material in the substantial absence of atmospheric oxygen or its equivalent at room temperature to 120° C. for a period of time sufficient for decomposition of the low decomposition temperature peroxide, for a substantial amount of fragmentation of the linear propylene polymer material to occur, and for a significant amount of long chain branches to form, but insufficient to cause gelation of the propylene polymer material;
   (3) treating the propylene polymer material in the substantial absence of atmospheric oxygen or its equivalent to deactivate substantially all the free radicals present in said propylene polymer material from the low decomposition temperature peroxide, to decompose the high decomposition temperature peroxide and then to deactivate any remaining free radicals present in said propylene polymer material from the high decomposition temperature peroxide.

12. A process according to claim 11 in which said amorphous to predominantly crystalline polypropylene is a normally solid, gel-free, predominantly isotactic, semi-crystalline polypropylene.

13. A process according to claim 11 in which the low decomposition temperature peroxide is selected from the group consisting of di(sec-butyl) peroxydicarbonate, bis(2-ethoxy)peroxy propyl-peroxy dicarbonate, di-n-butylperoxy dicarbonate, di-sec-butylperoxy dicarbonate, di-isopropylperoxy dicarbonate, t-butylperoxy neodecanoate, t-amylperoxy neodecanoate and t-butylperoxy pivalate.

14. A process according to claim 11 in which the high decomposition temperature peroxide is selected from the group consisting of 2,5-dimethyl-2,5-bis(t-butylperoxy) hexane, bis(t-butylperoxy-isopropyl) benzene, dicumyl peroxide, 4,4-di-t-butylperoxy-n-butyl valerate, t-amylperoxy benzoate, t-butylperoxy benzoate, 2,2-di-t-butylperoxy butane, t-butylperoxy-3,5,5-trimethyl hexanoate, t-butylperoxy isopropyl carbonate and 1,1-di-t-butylperoxy cyclohexane.

15. A process according to claim 11 in which the low decomposition temperature peroxide has a half life of less than or equal to 5 minutes in the temperature range from about 90° C. to 120° C., or a half life of less than 40 minutes in the temperature range from about 60° C. to about 90° C., or a half life of less than 60 minutes in the temperature range from room temperature to about 60° C., and the high decomposition peroxide has a half life of greater than or equal to 20 minutes at 120° C., but greater than 60 minutes at the temperature used in step (3).

16. A process according to claim 15 in which the low decomposition temperature peroxide has a half life of 10 seconds to 5 minutes at the temperature used in step (2).

17. A process according to claim 15 in which the high decomposition temperature peroxide has a half life of 30 seconds to about 10 minutes at the temperature used in step (3).

18. A process according to claim 11 in which the temperature of step (2) is 60°–110° C.

19. A process according to claim 11 in which the temperature of step (2) is 70°–105° C.

20. A process according to claim 11 in which the temperature of step (3) is about 130° to 150° C.

21. A process according to claim 19 in which the temperature of step (3) is about 140° to 150° C.

22. A process according to claim 11 in which the temperature to be used in step (2) is established and maintained for at least 20 seconds prior to the addition of the low and high decomposition peroxides.

* * * * *

UNITED STATES PATENT AND TRADEMARK OFFICE
CERTIFICATE OF CORRECTION

PATENT NO.  : 5,047,485

DATED       : September 10, 1991

INVENTOR(S) : Anthony J. DeNicola, Jr.

It is certified that error appears in the above-identified patent and that said Letters Patent is hereby corrected as shown below:

Col. 2, line 46, change "high-molecularweight" to-- high-molecular weight--.

Col. 16, line 8, (claim 13) after "bis(2-ethoxy)peroxy" insert --dicarbonate, di-cyclohexylperoxy dicarbonate, di-n- --.

Signed and Sealed this

Nineteenth Day of January, 1993

Attest:

DOUGLAS B. COMER

Attesting Officer

Acting Commissioner of Patents and Trademarks